(12) United States Patent
Downs, Sr.

(10) Patent No.: US 8,904,705 B2
(45) Date of Patent: Dec. 9, 2014

(54) AEROPONIC SYSTEM AND SPRAYER DEVICE FOR IMPROVED PLANT GROWTH AND AERATION

(76) Inventor: Thomas J. Downs, Sr., Berlin, NJ (US)

(*) Notice: Subject to any disclaimer, the term of this patent is extended or adjusted under 35 U.S.C. 154(b) by 775 days.

(21) Appl. No.: 13/169,599

(22) Filed: Jun. 27, 2011

(65) Prior Publication Data

US 2012/0005957 A1 Jan. 12, 2012

Related U.S. Application Data

(60) Provisional application No. 61/362,101, filed on Jul. 7, 2010.

(51) Int. Cl.
*A01G 31/00* (2006.01)
*A01G 31/02* (2006.01)

(52) U.S. Cl.
CPC ........................... *A01G 31/02* (2013.01)
USPC ........................... 47/62 A; 47/62 R (58) Field of Classification Search
USPC ........................... 47/62 A, 62 R, 79
See application file for complete search history.

(56) References Cited

U.S. PATENT DOCUMENTS

| | | | |
|---|---|---|---|
| 4,332,105 A | 6/1982 | Nir | |
| 4,514,930 A | 5/1985 | Schorr | |
| 5,502,923 A * | 4/1996 | Bradshaw | 47/62 A |
| 5,557,884 A | 9/1996 | Deppe | |
| 5,724,768 A * | 3/1998 | Ammann, Jr. | 47/62 A |
| 6,247,268 B1 * | 6/2001 | Auer | 47/62 R |
| 6,584,730 B1 * | 7/2003 | Mai | 47/79 |
| 7,877,927 B2 * | 2/2011 | Roy et al. | 47/62 C |
| 2008/0005962 A1 * | 1/2008 | Hashimoto et al. | 47/79 |
| 2009/0293357 A1 | 12/2009 | Vickers | |
| 2012/0085026 A1 * | 4/2012 | Morris | 47/62 A |

* cited by examiner

*Primary Examiner* — Monica Williams
(74) *Attorney, Agent, or Firm* — Daniel Boudwin; Global Intellectual Property Agency LLC (57) ABSTRACT

An aeroponic growing system, double T-shaped sprayer design and method for cultivating larger plant crops and increasing harvest frequency. The system comprises a series of aeroponic growing units, each of which supports a plant's roots within an enclosure. The enclosure houses a sprayer, an interior volume of plant nutrient solution and a plumbing system for accepting and distributing the aqueous water-nutrient solution. The internal sprayer is a double T-shaped mister that sprays an atomized mist directed from a first set of nozzles onto the plant roots, along with a second set of nozzles directed toward the base of the enclosure to aerate the interior volume of plant nutrient solution. The T-shaped mister provides circumferential coverage of the plant roots, while the aeration of the plant nutrient solution provides an aerated solution that accelerates plant growth through a hybrid process of Nutrient Film Technique (NFT) called a Hyperactive Aeroponic Shallow Water Culture (HAS Culture). Several interconnected aeroponic growing units may be stationed in a parallel grid to provide ample space for rapid growth of crops, while supplying the water and nutrient solution through a network of pipes and tubes between units.

16 Claims, 6 Drawing Sheets

AEROPONIC SYSTEM AND SPRAYER DEVICE FOR IMPROVED PLANT GROWTH AND AERATION

CROSS REFERENCE TO RELATED APPLICATION

This application claims the benefit of U.S. Provisional Application No. 61/362,101 filed on Jul. 7, 2010, entitled "Aero Giant."

BACKGROUND OF THE INVENTION

1. Field of the Invention

The present invention relates to horticultural aeroponic methods and devices for large plant crop production. More specifically, the present invention pertains to an aeroponic growing system that is modular and scalable, wherein individual growing units contain a uniquely designed, T-shaped sprayer device for misting the roots of a plant and aerating a nutrient reservoir below the roots. The unique elements of the system include the internal sprayer device, which includes plant misting means and a means to aerate a nutrient solution within each enclosure, the parallel grid design of enclosures that preferably utilizes a rigid plumbing connection, the ability to drain the system efficiently and without draining each enclosure individually, and finally the use of an external water pump or ability to accommodate an internal water pump and chiller device that controls the water temperature in the system. Further, the design of the grid system, particularly the distance between growing units and the large enclosures for housing each plant roots, provides a system that prevents root lock and stifled growth due to crowding.

2. Description of the Prior Art

Aeroponic gardening is an advanced form of hydroponic horticulture, wherein plant roots are suspended within an enclosed environment and provided water and nutrients via a misting process. The medium for root growth is air, therefore continual misting is required for plant development and prevention of dehydration. An aqueous nutrient solution is sprayed directly onto the roots of each plant from a misting sprayer device supplied via a plumbing system. The sprayer atomizes the mixture and creates an evenly distributed, fine particle mist for root coverage and plant nourishment.

There are several benefits to this horticultural method, including increased air exposure to the plant's roots, which stimulates growth through the abundance of oxygen, along with direct application of nutrients and water through the atomized mist. Complete access to carbon dioxide in the air is also achieved, which is necessary for photosynthesis. Further, the risk of unhealthy plants in an aeroponic garden is decreased over traditional methods as there is no "dirt" soil involved. Conditions are more aligned to a laboratory standard so the risk of infestation and disease is lessoned. The misting spray means is also under close control and can be rapidly adjusted to prevent contamination. The spray itself may be sterilized, adjusted or ceased by the user if desired. The absence of soil provides the grower an increased level of control over the plant development.

Traditional aeroponic gardens have several drawbacks to their design which inherently limit plant growth and do not provide an optimal growing environment. Typical aeroponic gardens include a plurality of root support locations within an enclosure, or alternatively include a plurality of smaller enclosures that are placed in series with one another. When in series, the flow of nutrients and water from one enclosure to the next is dependent upon the flow of water from a preceding enclosure. In a parallel setup, the enclosures may be disconnected without affecting any downstream growing units. The use of closely placed growing units or root support locations in typical setups also limits plant development and introduces root lock.

Typical aeroponic gardens also incorporate flexible plumbing for nutrient/water distribution. Large plant growth, particularly those which exhibit large flowering regions tend to be top heavy and prone to tipping. Without adequate support from the growing unit and surrounding plumbing structure, the units may topple over and cause damage to the plants and the attached system of flexible plumbing. The present invention contemplates use of rigid plumbing for further plant support and improved modularity. Connections and further expansion can be provided through branched connections and additional growing units.

Efficient drainage is also a problem with most aeroponic systems. Typically, each growing unit must be individually drained. Certain setups even require use of a shop vacuum or other suction means for removing water from each enclosure. The present invention provides an efficient means for draining the system as a whole from a centralized location, without requiring the user to drain each growing unit individually. This is particularly useful during the floral cycle, wherein more frequent drainage and flushing of the system is required.

Finally, adequate oxygenation of the nutrient solution provided for each enclosure is desired for improved plant health and development. Typical devices utilized for oxygenating a system include air hoses and fish tank style bubblers. These devices require external power, are cumbersome to utilize and in some cases do not adequately oxygenate the entire system simultaneously, as they are located at a single point in the system. The present invention provides a misting device and method that both mists the plant roots and oxygenates a layer of solution within each growing unit. The misting device provides a downward facing sprayer that breaks the surface tension in the solution reservoir within the enclosure, aerating the solution and introducing oxygen at each growing unit location.

Patents have been published for various hydroponic and aeroponic systems and devices. These include improvements to specific components of a traditional aeroponic garden, while others modify the entire process by providing a new method of aeroponic gardening. The present invention provides a scalable growing unit system, wherein aeroponic plants are not clustered in close proximity to one another, yet the unit system allows modularity and scalability with regard to the overall size of the garden. The result is an interconnected parallel configuration of aeroponic units that provides sufficient space for large scale and rapid plant growth. Each unit is provided a connection to a nutrient and water plumbing system, along with an internal sprayer device. The sprayer device provides a mist that covers the entirety of the plant roots by providing circumferential coverage thereof. The spray also aerates a layer of nutrient solution along the base of each unit to provide an oxygenated layer of nutrients for the plant roots to extend into and for recirculation and reapplication via the sprayer device. This method is similar to the process of Nutrient Film Technique (NFT), but is updated to form a Hyperactive Aeroponic Shallow Water Culture (HAS Culture).

U.S. Pat. No. 4,514,930 to Schorr describes an aeroponic plant apparatus and method that utilizes an enclosed chamber with a plurality of support positions for a grid of plant roots. An aqueous composition of tap water, concentrated hormone, nutrient or other plant growth composition is formed through a suction venturi and directed onto the plant roots through mist nozzles. A timer controlled solenoid is provided to regulate the water flow and drain. While this device describes an aeroponic growing device, it is provided in a form that aligns several plants in close proximity to one another. This limits their growth potential, which is the opposite intent of the present invention. The present invention provides large, individual growing units that connect via a network of pipes for providing an aqueous water and nutrient supply. Neither the design of the units nor the sprayer mechanism is described in the Schorr patent.

U.S. Pat. No. 4,332,105 to Nir describes an aeroponic growth and development apparatus for plants including a growing unit with at least one perforate plant support and a time controlled misting means. This device describes an aeroponic growth setup that employs unit enclosures for plant roots, a pump and circulation means for a nutrient solution, along with timing controlled sprayers for application of the nutrient solution on the plant roots. No mention is made of the specific design of each unit enclosure or of a specific sprayer means. The present invention provides an enclosure with a sprayer device that provides complete coverage of the plant roots, while at the same time aerating a nutrient base layer within the unit for recirculation and distribution.

U.S. Pat. No. 5,557,884 to Deppe describes another aeroponic growing system and a unique spray head for oxygenating and dispensing liquid nutrients. Similar to the Nir patent, no mention is made of a specific sprayer means that describes the elements of the present invention sprayer means. Further, the Deppe patent describes a plurality of plant tubes for support of a series of plant roots, as opposed to discretely connected grower units that provide space and a means for large scale plant growth at an increased harvest cycle.

U.S. Pat. No. 6,247,268 to Auer describes an improved hydroponic device that is readily constructed from off the shelf components. The device provides a modularly expandable setup employing a plurality of aligned growing baskets within a tubular reservoir. Liquid water and nutrients are fed through the tubular reservoir for providing a plurality of plant roots with necessary nourishment for growth. The design of this system, along with its means for providing water and nutrients to a plant's roots differs from the present invention. The Auer patent is a hydroponic system, as opposed to an aeroponic system wherein water and nutrients are sprayed onto the roots and the medium for growth is air rather than water.

U.S. Published Patent Application No. 2009/0293357 to Vickers describes an apparatus and method for delivering an atomized spray of air and nutrient rich liquid through a nozzle for aeroponic purposes. The specifically designed nozzle controls the droplet size and spray pattern for optimal root coverage and absorption. This device describes a nozzle sprayer itself and kit therefor; however no mention is made of a larger aeroponic system, particularly one suited for large plant growth in modular unit cells, as described by the present invention.

The aforementioned prior art patents have clear drawbacks in their structure and design when compared to the elements of the present invention. Namely, the ability to rapidly grow large scale plant crops in individual growing units, while providing nourishment via a uniquely designed, T-shaped sprayer is not described. The sprayer includes a plurality of nozzles that are directed and oriented in different directions, providing complete coverage of the plant's roots and aeration of a base layer of aqueous water and nutrient mixture. Plumbing from one unit to another and back to a pump house provides the motive force for the flow of water and nutrients between units.

The present invention substantially diverges in design elements from the prior art, and consequently it is clear that there is a long felt need for an improvement to existing aeroponic growing devices and systems, specifically for large scale plant growth, modular growing units and a specifically designed sprayer device. In this regard the instant invention substantially fulfills these needs.

SUMMARY OF THE INVENTION

In view of the foregoing disadvantages inherent in the known types of aeroponic growing systems now present in the prior art, the present invention provides a new aeroponic growing system, sprayer device and method wherein the same can be utilized for providing convenience for the user when growing large scale plants utilizing a modular growing unit system.

It is therefore an object of the present invention to provide a new and improved aeroponic growing system and sprayer device that has all of the advantages of the prior art and none of the disadvantages.

Another object of the present invention is to provide a modular and expandable grid system of aeroponic growing units, particularly those suited for large plant growth and rapid harvesting. The growing units comprise a tubular enclosure with an elevated basket for supporting a plant and suspending roots thereof within the environment of the enclosure. A sprayer device within the enclosure provides continual hydration and nourishment via a misting process and specifically design sprayer. An aerated, nutrient rich layer is provided along the base of each enclosure for circulation, distribution and plant absorption.

Another object of the present invention is to provide a unique misting sprayer device designed to function within the cavity of each growing unit. The sprayer provides an inlet for receiving a fresh supply of a water-nutrient solution and a piping system that routes the solution to a plurality of sprayer nozzles. Two sets of nozzles are provided. The first set provides a spray directly onto the plant roots from opposing sides, with nozzles facing both vertically and at an orientation directed at the plant root support. The second set of nozzles is projected downward, towards the layer of aqueous nutrient solution along the base of the enclosure. The downward spray provides a means to aerate the nutrient layer, improving oxygenation prior to recirculation and redistribution.

Another object of the present invention is to provide a new method of aerating a circulating liquid nutrient mixture throughout an aeroponic garden, utilizing a downward spraying device that breaks the surface tension in the liquid reservoir and oxygenates the same.

Another object of the present invention is the utilization of a parallel plumbing setup for the aeroponic garden, wherein the grid of growing units are formed in a parallel configuration as opposed to a series configuration. This set up allows disconnection of one growing unit without altering the supply of nutrient solution to another growing unit. Adequate water pumps are provided to account for the head loss across the entire system, which is increased when compared to series setups; however the drawbacks of a series setup with regard to flexibility greatly outweigh the drawback of a slightly larger water pump in a parallel configuration.

Another object of the present invention is to provide an efficient means of draining the entire system without draining each growing unit individually. A process of spillover and a series of drain valves are utilized to flush the entire system without requiring the user to tend to each growing unit, which is very useful during flowering cycles where more frequent draining of the system is necessary. Control is provided for the reservoir level within the enclosures through the use of dual drain outlets and a main drain valve for each branch in the system.

Another object of the present invention is to provide an external water pump for circulation of the nutrient solution through the aeroponic system. The pump provides the pressure required to flow water through each growing unit and through the spraying means. The use of an external pump reduces heat transfer to the water supply as the pump heats up, eliminating the need for a water chiller to control water temperature. The system is likewise modular to accept the use of an internal pump and water chiller if desired, although it is not required for appropriate use of the present system. The use of external pump also eliminates the need for a timing circuit to control the pump action, as the pump does not heat the water supply after extended use. A timer may be included for conservation purposes and greater control; however the present invention preferably functions continually without such a timer.

Yet another object of the present invention is to provide a modular growing system that provides a scalable grid system, wherein a single plant may be grown within a unit in the grid. Adequate proximity between units provides ample space for large scale plant growth. Continual and complete spray coverage of each plant roots, along with application of an oxygenated, nutrient solution, provides nourishment for superior plant health and growth.

Other objects, features and advantages of the present invention will become apparent from the following detailed description taken in conjunction with the accompanying drawings.

BRIEF DESCRIPTIONS OF THE DRAWINGS

The above invention, along with its associated objects, will be better understood and more readily apparent after a study of the following detailed description. Such description makes use of the annexed drawings wherein like referenced numerals are utilized throughout the figures.

DETAILED DESCRIPTION OF THE INVENTION

Figure 1:
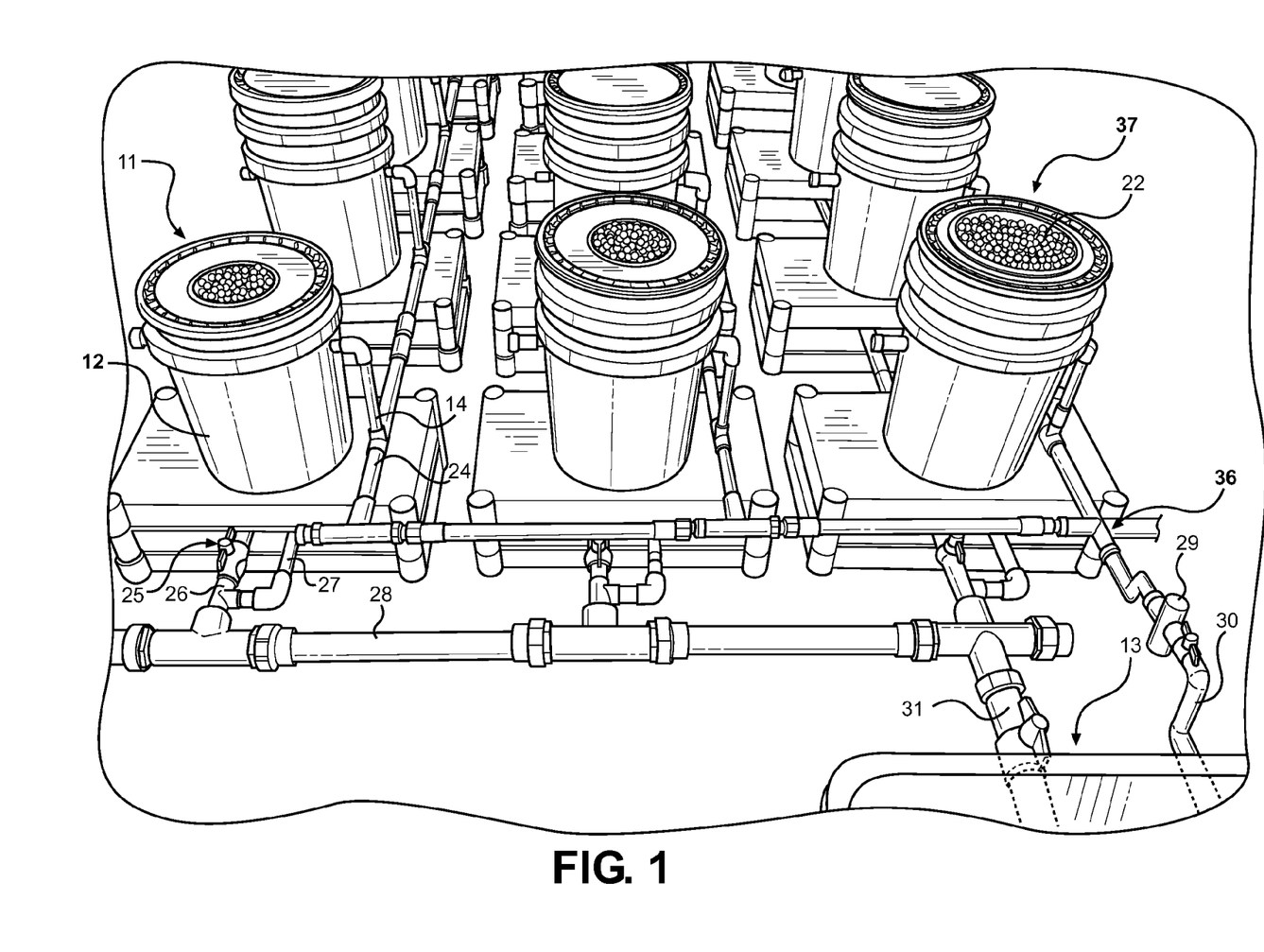
FIG. 1 shows an overhead perspective view of the present invention in use, wherein several growing units are aligned in a grid pattern and interconnected via a plumbing network.

Referring now to FIG. 1, there is shown an overhead perspective view of the present invention, wherein a plurality of growing units 11 is placed in a grid configuration and interconnected via a rigid plumbing network. Each growing unit 11 comprises an enclosure 12 with an elevated plant support basket. The baskets include a mesh cavity filled with clay pellets as a medium of root growth prior to expanding into the cavity of the enclosure 12. Within each enclosure is a liquid spray means and a layer of nutrient rich, liquid solution that is continually aerated and replenished for further growth and development of the plants as the plant's roots engage the layer of nutrients. The network of plumbing originates from a pump house 13, which provides the motive force to flow the water/nutrient solution from one growing unit 11 to another.

The pump provides high pressure liquid through the pump outlet pipe 30, which passes through a filter 29 prior to distribution. The outlet pipe feeds a plurality of high pressure distribution pipes 24 that flow water from the pump to the growing units. Growing unit connecting pipes 14 branch out, in a parallel configuration, from the distribution pipes 24 to feed the growing unit internal sprayer means. In this configuration, each growing unit 11 may be removed from its connection to the distribution pipe 24 without disrupting downstream units. The connecting pipes 14 are preferably a smaller inner diameter pipe than the distribution pipes 24, which increases pressure via a reduction in cross sectional area and its action as an effective nozzle.

The internal sprayer means provides dispensation of water into each enclosure 12 for direct application onto the plant roots and collection at its base, forming a reservoir of water and nutrients. Each growing unit drains through a singular outlet pipe 26 that connects downstream to a unique prime growing unit 11, which controls the water level along a connected branch of growing units. Specifically, the depth of each reservoir is controlled via two drains in the prime growing unit 11. The prime growing unit enclosure is the first enclosure along a branch in the system, as pointed out as 11 in FIG. 1 and FIG. 2. Each enclosure 12 in the system is provided with a drain that connects to the outlet pipe 26 and is flushly mounted to the base surface of the each enclosure 12. A second drain is present in the prime growing unit 11 enclosure, which is elevated above the first drain. An external drain valve 25 controls the flow of water from each reservoir through the outlet pipe 26 and back to a return pipe 28 for entry back into the pump house 31. When the drain valve 25 is in a closed position, water cannot escape through the flush mounted drains of each enclosure 12. The depth of each reservoir increases until it reaches a level in the prime growing unit enclosure, after which it flows into this elevated drain and out of the prime enclosure through a secondary drain pipe 27. This process is known as spillover or overflow control, wherein a prime growing unit 11 at the base of each branch in the system controls the water level in all upstream growing units 34 (FIG. 2) based on the height of the prime growing unit's elevated drain. In normal operation, the external drain valve 25 is in a closed position, retaining a reservoir of water in each enclosure 12 defined by the elevated drain position for supplying the plants' roots with hydration and nutrients.

The growing unit closest to the pump house is designated as the pump prime unit 37, and includes an X-fitting 36 for parallel branches to be supplied along either side of its particular branch. The pump house 13 itself preferably utilizes an external water pump to reduce heat transfer from the pump to the water supply. Alternatively, an internal water pump and water chiller may be utilized if desired. As shown in FIG. 1, a network of growing units is positioned in a grid pattern, aligned in a branching configuration from the pump house outlet pipe 30 and draining back into a single return pipe 28. Distribution pipes 24 branch from the outlet pipe 30 to supply water to each consecutive growing unit 11 along the branch. Growing unit connecting pipes 14 provide a parallel configuration to optionally supply water to the sprayer means within the given enclosure. Each branch and each connecting pipe 14 may be detached or shut down without affecting neighboring branches or growing units 11. This setup is superior to typical setups that align all growing units 11 in a single series, which does not allow flexibility to remove a single unit without compromising the entire system.

The present invention is a modular and scalable aeroponic garden that can accommodate large plant growth given the ample separation between growing units and the large enclosures 12 used to house each roots system. The space between growing units is dependent upon user preference and the intended crop to be harvested. The connection between units may be adjusted by changing the length of connected pipes. This provides the user with flexibility to grow large-flowering crops that consume a considerable volume above the growing units.

The plumbing is preferably be supplied via rigid PVC or equivalent piping, as opposed to flexible tubing that does not provide adequate support for the growing units in the event of top heavy crops. Flexible hosing may be incorporated, although it is not desired in the preferred embodiment. The exact setup design, grid layout and type of plumbing are dependent upon user preferences and space allotted for the garden. It is not desired to limit the present invention to a specific number of branches or growing units, but rather FIG. 1 is provided as an example embodiment of the present invention. It is not desired to limit the present disclosure to an exact grid layout or design, but rather to disclose a system that may be constructed based on the teachings of the present invention by one skilled in the art and modified to suit a given situation or need.

Figure 2:
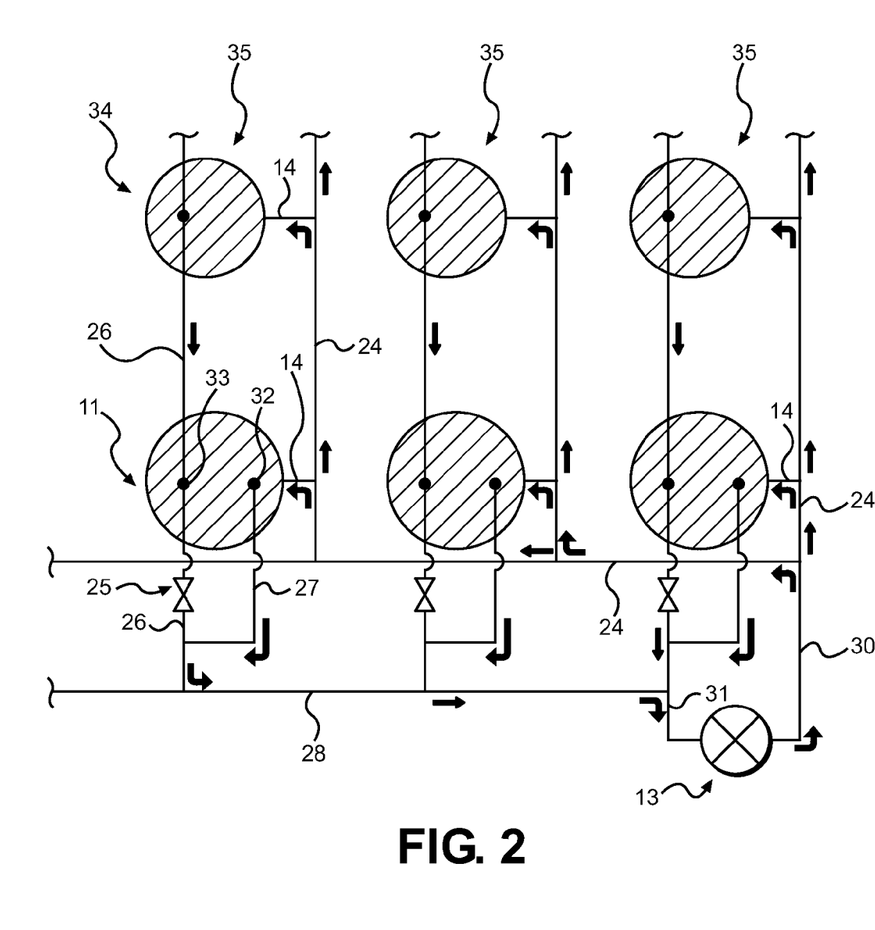
FIG. 2 shows a schematic diagram of the present invention, including the flow of fluid through the system and the scalability thereof.

Referring now to FIG. 2, there is shown a schematic wire diagram representation of the present invention. As described, fluid is pumped from a pump house 13 and sent through a pump outlet pipe 30 to a series of branches 35 and plant enclosures 11, 34. Distribution pipes 24 provide flow of fluid from the outlet pipe 30 to each branch 35 in the system and to each growing unit connecting pipes 14 connected in parallel to the distribution pipes 24. At the base of each branch 35 in the system is a prime growing unit 11, which contains two drains, a first elevated drain 32 and a second lower drain. Non-prime growing units 34 are placed upstream from the prime growing unit 11 in each branch. The fluid level in each enclosure along a branch 35 is controlled by the level in the prime growing unit 11, while flushing a particular branch of fluid is controlled by a drain valve 25 at the base of each branch. The size of the system can grow by adding additional branches 35 or by adding additional non-prime growing units 34. The system is set up in a modular fashion to allow accommodation of a particular environment, while also providing parallel connectivity between both branches 35 in the system and between enclosures along a branch.

Figure 3:
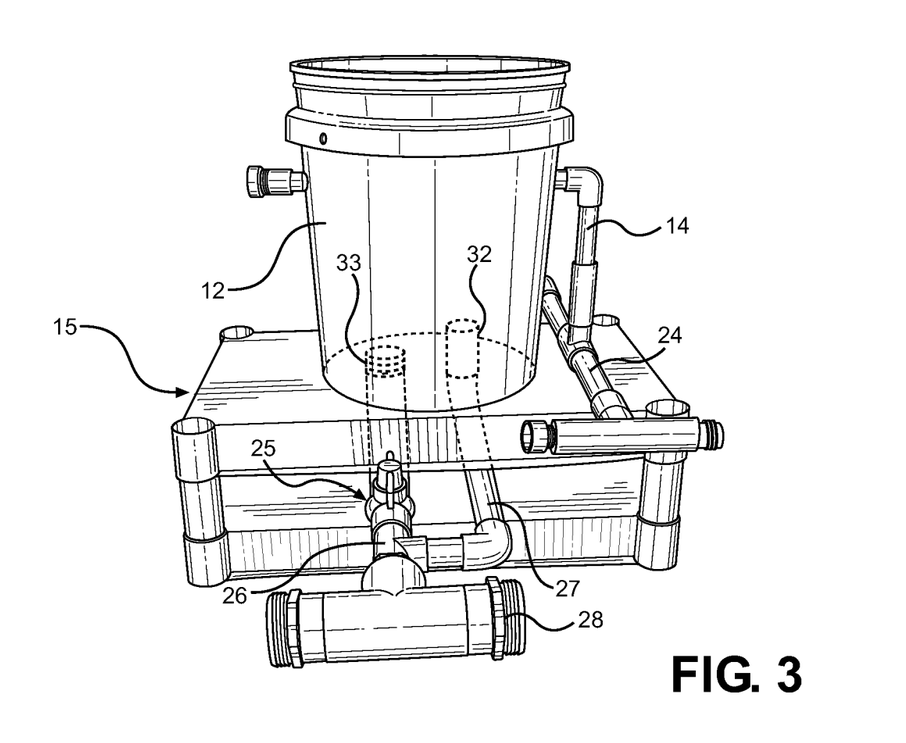
FIG. 3 shows a perspective view of a prime growing unit, including the enclosure and plumbing therefor.

Referring now to FIG. 3, there is shown a perspective view of a prime growing unit, including an enclosure 12, an elevated drain 32 and a secondary drain pipe 27. The prime units are the only units in a branch that include an elevated drain 32. These units are positioned farthest downstream and closest to the return pipe 28, which feeds into the pump house for redistribution of water through the system. The prime units control the depth of water in all upstream growing units via control of the drain valve 25, which when closed restricts flow from the branch's lowest point, the prime growing unit lower drain 33. The water level in each reservoir increases until the level in the prime unit spills over or overflows into the elevated drain 32 and out through the secondary drain pipe 27. The secondary drain pipe 27 then regulates the level of all upstream growing units. A spacer or a plurality of spacers is used to control the height of the secondary drain pipe 27, which determines the depth of the reservoir by increasing or decreasing the amount of spacers or the size thereof. This allows the user to dictate the depth of the reservoir in each branch of the system by controlling the spacer and therefore the height of the secondary drain pipe 27.

The water and nutrient mixture is provided to each growing unit through distribution pipes 24 and connecting pipes 14 branching therefrom. The connecting pipes 24 enter the enclosure 12 along one side and feed the internal sprayer means stationed within. Similar growing units as shown in FIG. 2, although without the elevated drain 32, are positioned upstream from the prime growing unit and connected from beneath via a singular outlet pipe 26, which connects to each growing unit's drain 33 for drainage of water in to the return pipe 28 for redistribution by the pump house.

The drain valve 25 along each branch of the present invention provides a means to drain the entire branch of growing units upstream from the valve 25 location. All water contents are drained from the enclosures 12 and flow through the outlet pipe 26 without the need for an external suction means or draining each enclosure independently. This setup is superior to existing aeroponic drainage setups, as it allows quick drainage during the floral cycle when repetitive draining of the system is necessary.

Figure 4:
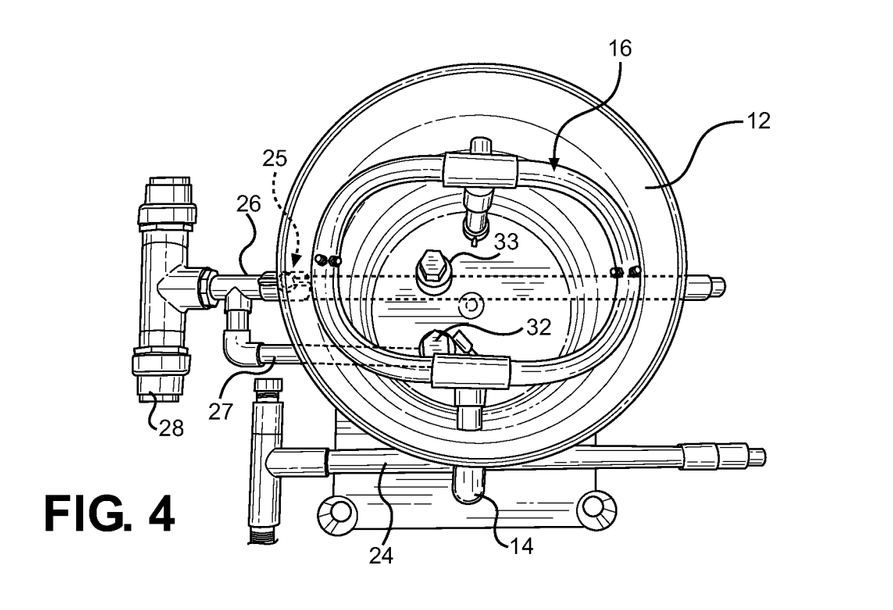
FIG. 4 shows an overhead perspective view of a prime growing unit, including the enclosure, plumbing and an internal sprayer device.

Referring now to FIG. 4, there is shown an overhead perspective view of a prime growing unit, wherein two drains 32, 33 and a secondary drain pipe 27 are provided, and the growing unit is placed furthest downstream along a branch of growing units and closest to the return pipe 28. The internal contents of the enclosure 12 is visible, including the sprayer means 16 that is provided high pressure water via a connecting pipe 14 that enters through a side of the enclosure. The sprayer means 16 is a preferably a ring or half ring pattern that allows for a central opening in the enclosure to accommodate root growth towards the base. A plurality of vertical projections extends down towards the base of the enclosure and towards the reservoir of water therein. A plurality of misters, sprayers or atomizing nozzles provides distribution of the incoming water solution directly from sites along the ring and on the projections extending therefrom. The sprayers direct a uniform, atomized mist of liquid directly onto the suspended plant roots, while simultaneously directing spray towards the reservoir below for aeration and oxygenation purposes. As the water and nutrient solution passes from one growing unit to the next, it is continually oxygenated, provided a 'supercharged' mixture of oxygenated water for improved health and growth of the plant.

Directing the spray of water onto the reservoir of water provides a means to break the surface tension thereof and infuse the water and nutrient solution with oxygen, a key feature of the present invention the provides oxygenated water throughout the grid of growing units for improved growth. An external air pump may be used in conjunction with the present invention setup; however this additional means of oxygenation is not require for normal operation. The contemplated device for directing spray directly onto the reservoir for oxygenation already provides for explosive growth and health of the intended crop.

Figure 5:
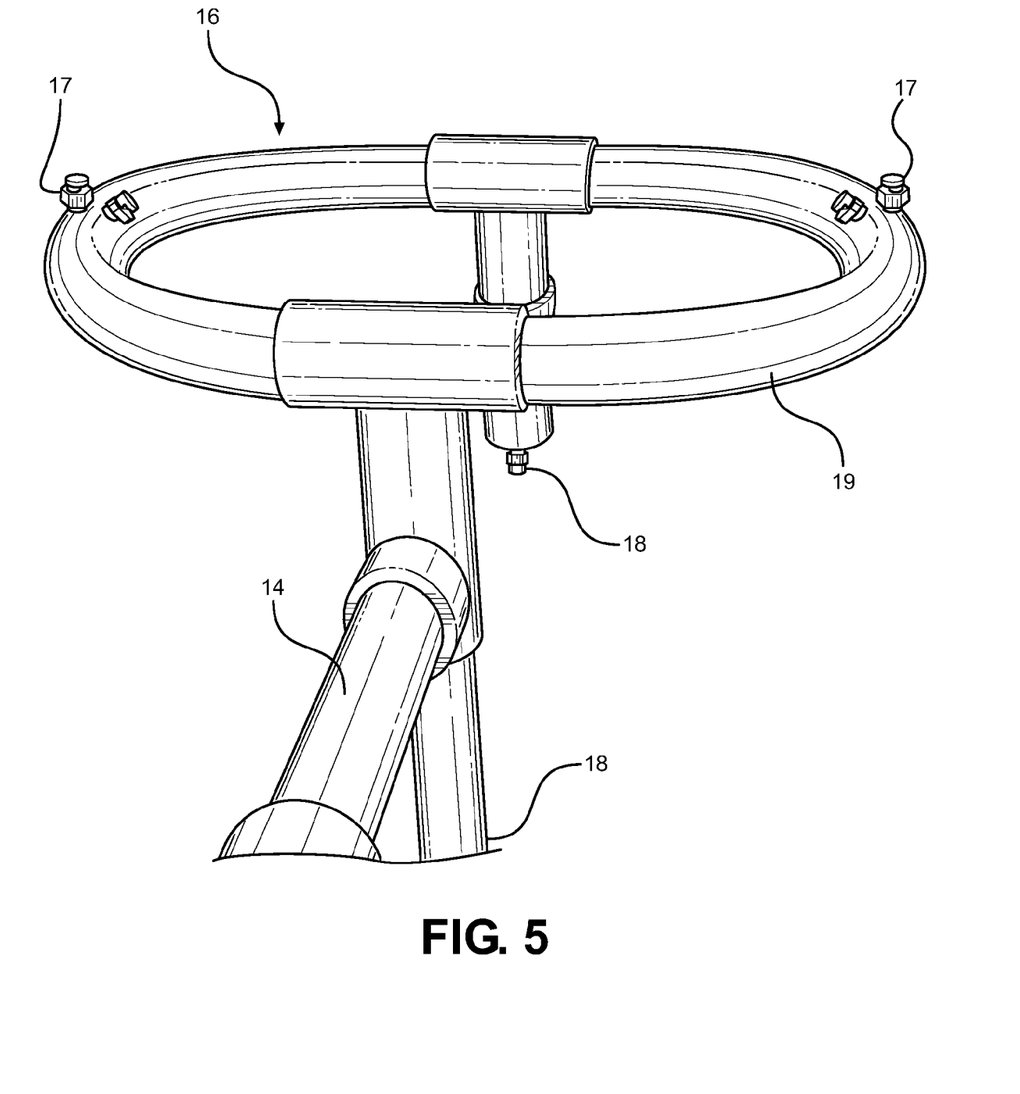
FIG. 5 shows a perspective side view of the preferred embodiment of the internal sprayer device.

Referring now to FIG. 5, there is shown a perspective side view of the preferred embodiment of the internal sprayer means 16. The sprayer mean is housed internally within the growing unit enclosures, and is provided a high pressure flow of water via a connecting pipe 14 that branches off of the distribution pipe running along the length of each branch of growing units. A plurality of sprayer nozzles, misters or atomizers are provided along the length of the sprayer means 16.

Preferably, the sprayer means is a ring or half ring 19 section of piping that directs water around the perimeter of the interior of each enclosure. An opposing first set of sprayers 17 along the rings project a spray of water directly onto the plant roots that are suspended within the ring interior. The first set of sprayers 17 direct water radially inward and at an upward angle from the ring 19 and from opposing sides, which provides circumferential coverage of the plant roots and complete hydration thereof. Two vertical projections extend from the ring 19 in a downward direction towards the base of the enclosure. These projections provide support for a second set of nozzles 18 that spray water onto the reservoir below for aeration and oxygenation purposes. The sprayers may be blocked off or allowed to flow water therethrough depending upon the size of the roots and the user preferences. If the roots of the plant are not fully grown or extended into the enclosure, those sprayers misting into open air may be blocked off and water directed to the remaining sprayer nozzles. The operable nozzles are dependent upon the stage of growth and the user setup.

Figure 6:
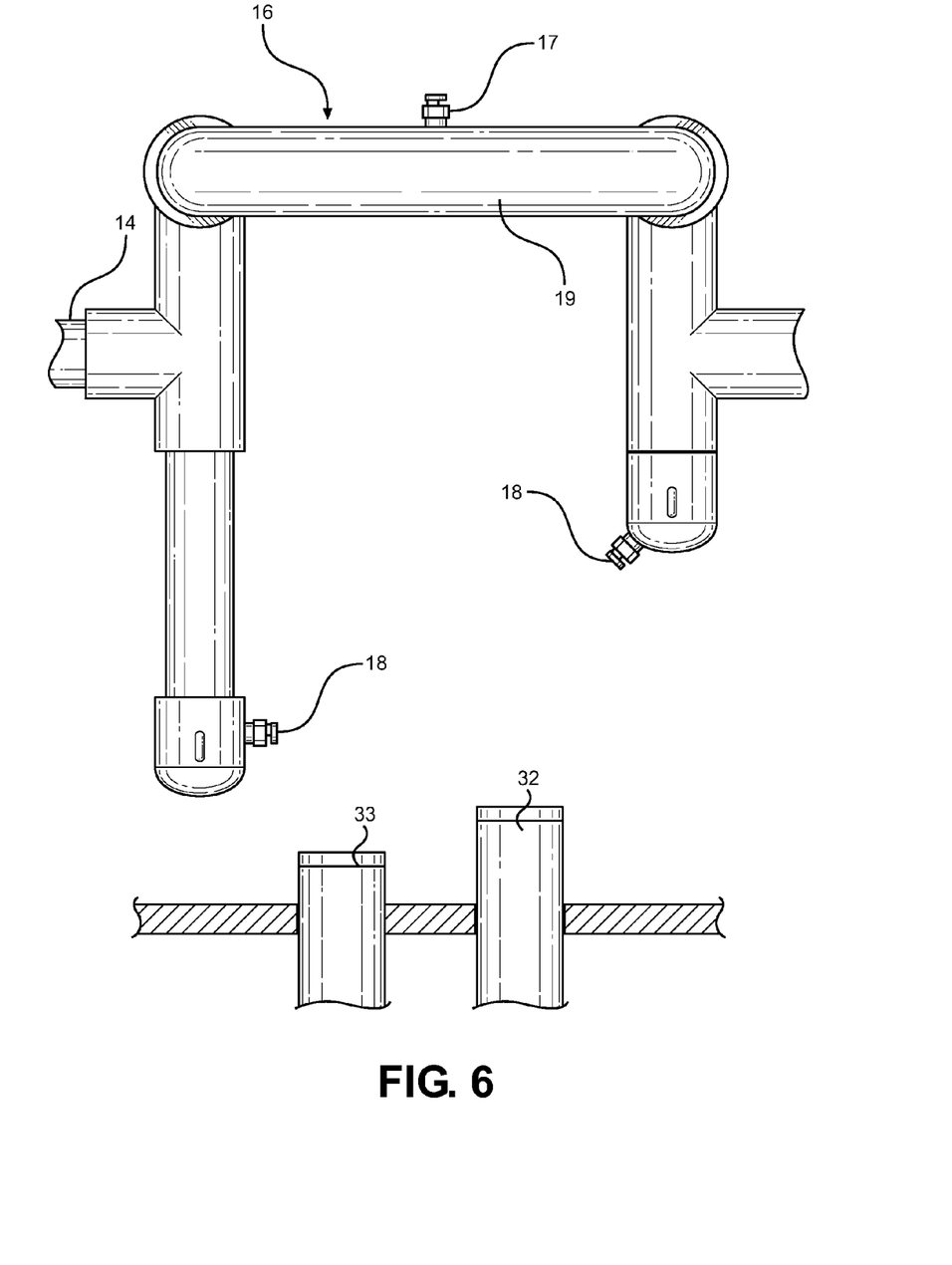
FIG. 6 shows a side view of within the prime growing unit.

Referring now to FIG. 6, there is shown a side view of within the prime growing unit, wherein the preferred embodiment of the internal sprayer means 16 and dual drains 33, 32 are illustrated. The preferred sprayer means provides a ring structure of piping and a plurality of vertical projections to communicate fluid from the connecting pipe 14 to a plurality of spray nozzles 17, 18. The first set of nozzles 17 provides nutrition and hydration of the suspended roots, while the second set of nozzles 18 provides for aeration of the reservoir within the enclosure. A first drain 33 is provided along the base of the enclosure for draining means, while a second, elevated drain 32 is provided as a 'spill-over' drain. The elevated drain 32 is used to maintain a specific depth of water within each upstream enclosure. Once the water level in the prime growing unit exceeds the height of the elevated drain 32, water exits the prime growing unit and consequently all upstream units. In this way, the water level of all units is regulated by the height of this drain 32. The volume within all enclosures along a branch forms a singular control volume, from which water is enters via the sprayer means. Water exits this control volume through one of two ways. With the drain valve closed, water exits when the incoming water causes the reservoir depth to reach the elevated drain height 32. When the drain valve is open, water drains from the first, flush mounted drain valve 33, which is the lowest point along a branch of growing units. Water exits the control volume and enters the return pipe for entry back into the pump house for redistribution.

Figure 7:
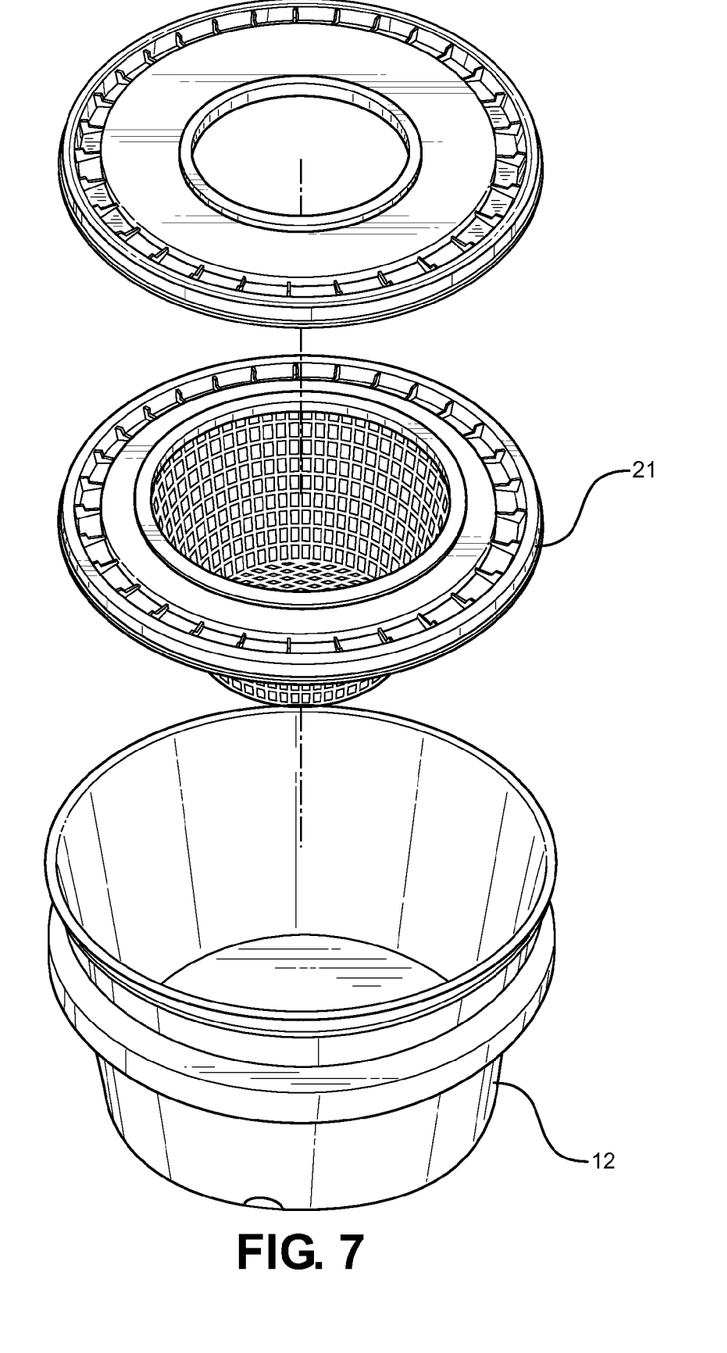
FIG. 7 shows an exploded perspective view of the plant support basket mounted above each growing unit enclosure.

Referring now to FIG. 7, there is shown an exploded view of a growing unit basket 21, along with the upper portion of an enclosure 12. The growing basket 21 holds the base of the plant and provides support thereof. Typically, clay pellets fill the interior cavity of the basket to supply a medium of growth for the base of the plant roots. The roots extend downward and protrude through perforations or penetrations in the basket, allowing the roots to grow into the cavity of the enclosure 12 and be suspended therein for spray hydration and absorption of the water from the reservoir below.

In use, the present invention provides a system for increased growth potential of a plant species. The application of nutrients and water directly onto the plant roots, while simultaneously aerating the reservoir below provides a combination that rapidly grows a plant's roots and floral region. The system and disclosed method of aeroponic aeration is a major improvement in the art of aeroponic gardening, while its individual components are of particular novelty. The dual action sprayer means, the parallel grid design, the single point drainage means and an external pump provides a unique system and device for aeroponic gardens, particularly those which may require rapid and expansive growth and increased harvest cycles.

It is not intended to limit the present invention to the figures provided, or to limit the system to a particular grid design. The setup described for utilizing the present invention and its devices is modular by nature, and therefore it is desired to disclose the spirit of the invention and allow one skilled in the art to utilize such a disclosure to increase growth potential, modularity and harvest cycle of a desired crop.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aeroponic growing system, comprising:
a prime growing unit, a pump house and an interconnected network of plumbing for routing a supply of liquid;
said prime growing unit comprising an enclosure with an internal volume and base surface, support for a plant and roots thereof, a connecting pipe for water inflow into said enclosure, a first drain at said enclosure base surface and a second drain elevated above said enclosure base surface, and an outlet pipe and secondary drain pipe for water outflow from said drains;
a spraying means within said enclosure for directing an atomized mist of said liquid onto said plant's roots and downward towards a reservoir of liquid within said enclosure for aeration of said reservoir;
said outlet pipe and said secondary pipe connecting to a return pipe, further connected to said pump house for redistribution of said liquid.

2. The apparatus of claim 1, wherein:
a drain valve controls flow through said outlet pipe, and therefore flow through said first drain;
said drain valve closed position prevents liquid flow through said first drain, said elevated drain then utilized to drain liquid from said enclosure through said secondary drain pipe and maintain said liquid reservoir to a depth within said enclosure defined by said elevated drain height;
said drain valve open position used to drain said enclosure of liquid from said first drain.

3. The apparatus of claim 1, wherein:
said connecting pipe is connected in parallel to a length of distribution pipe that originates at said pump house;
said distribution pipe receiving high pressure liquid from said pump house.

4. The apparatus of claim 3, wherein:
said connecting pipe being of smaller inner diameter than said distribution pipe.

5. The apparatus of claim 1, wherein:
said support for said plant's roots comprises a perforated basket and a layer of clay pellets for growth medium;

said plant's roots extending through said perforations into said enclosure internal volume;

said basket and internal volume providing support for a singular plant for large growth thereof.

6. The apparatus of claim 1, wherein said network of plumbing comprises rigid piping for further growing unit support and plumbing durability.

7. The apparatus of claim 1, wherein:
said pump house comprises an external pump means for creating a high pressure flow of liquid through said network of plumbing without heating said liquid after continual operation.

8. The apparatus of claim 1, wherein:
said pump house comprises an internal pump means for creating a high pressure flow of liquid through said network of plumbing and a chiller means for regulating said liquid during pump means continual operation.

9. The apparatus of claim 1, further comprising:
one or a plurality of non-prime growing units upstream from said prime growing unit and connect together and to said prime growing unit by said outlet pipe;

said non-prime growing units comprising an enclosure with an internal volume and base surface, support for a plant and roots thereof, a connecting pipe for water inflow into said enclosure, a first drain at said non-prime enclosure base surface connected to said outlet pipe for water outflow from said non-prime enclosure first drain;

said connecting pipe connected in parallel to a length of distribution pipe that originates at said pump house;

said prime growing unit and said upstream non-prime growing units comprising a branch of said aeroponic growing system.

10. An aeroponic growing system, comprising:
a prime growing unit, a plurality of non-prime growing units, a pump house and an interconnected network of plumbing for routing a supply of liquid;

said prime growing unit comprising an enclosure with an internal volume and base surface, support for a plant and roots thereof, a connecting pipe for water inflow into said enclosure, a first drain at said enclosure base surface and a second drain elevated above said enclosure base surface, and an outlet pipe and secondary drain pipe for water outflow from said drains;

said non-prime growing units comprising an enclosure with an internal volume and base surface, support for a plant and roots thereof, a connecting pipe for water inflow into said enclosure, a first drain at said non-prime enclosure base surface connected to said outlet pipe for water outflow from said non-prime enclosure first drain;

said connecting pipes connected in parallel to a length of distribution pipe that originates at said pump house;

a spraying means within said prime and non-prime growing unit enclosures for directing an atomized mist of said liquid onto said plant's roots and downward towards a reservoir of liquid within said enclosures for aeration of said reservoir;

said prime growing unit and said upstream non-prime growing units comprising a branch of said aeroponic growing system;

said outlet pipe and said secondary pipe connecting to a return pipe, further connected to said pump house for redistribution of said liquid.

11. The apparatus of claim 10, wherein:
a drain valve controls flow through said outlet pipe, and therefore flow through said prime and non-prime growing unit first drain;

said drain valve closed position prevents liquid flow through said prime and non-prime growing unit first drain, said elevated drain of said non-prime growing unit then utilized to drain liquid from said entire branch of said growing units through said secondary drain pipe and maintain said liquid reservoir within said branch of enclosures to a depth within said prime growing unit enclosure defined by said elevated drain height;

said drain valve open position used to drain said branch of growing unit enclosures of liquid from said first drain.

12. The apparatus of claim 10, wherein:
said connecting pipes are connected in parallel to a length of distribution pipe that originates at said pump house and extends a length of said branch of growing units;

said distribution pipe receiving high pressure liquid from said pump house.

13. The apparatus of claim 12, wherein:
said connecting pipes being of smaller inner diameter than said distribution pipe.

14. The apparatus of claim 10, wherein:
said support for said plant's roots comprises a perforated basket and a layer of clay pellets for growth medium;

said plant's roots extending through said perforations into said growing unit enclosure internal volume;

said basket and internal volume providing support for a singular plant for large growth thereof.

15. The apparatus of claim 10, wherein said network of plumbing comprises rigid piping for further growing unit support and plumbing durability.

16. A method of aerating a liquid reservoir within an aeroponic garden, comprising the steps of:
employing an aeroponic growing system comprising:
a prime growing unit, a pump house and an interconnected network of plumbing for routing a supply of liquid;

said prime growing unit comprising an enclosure with an internal volume and base surface, support for a plant and roots thereof, a connecting pipe for water inflow into said enclosure, a first drain at said enclosure base surface and a second drain elevated above said enclosure base surface, and an outlet pipe and secondary drain pipe for water outflow from said drains;

a spraying means within said enclosure for directing an atomized mist of said liquid onto said plant's roots and downward towards a reservoir of liquid within said enclosure for aeration of said reservoir;

said outlet pipe and said secondary pipe connecting to a return pipe, further connected to said pump house for redistribution of said liquid;

utilizing said spraying means that sprays suspended plant roots within said prime growing unit while directing a spray towards said reservoir of liquid to break said liquid surface tension for oxygenation;

circulating said oxygenated liquid through said network of plumbing for redistribution.

* * * * *